(12) United States Patent
Kisaichi

(10) Patent No.: US 6,621,236 B1
(45) Date of Patent: Sep. 16, 2003

(54) DISCHARGE LAMP LIGHTING DEVICE AND ILLUMINATION DEVICE

(75) Inventor: Hiroyasu Kisaichi, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/958,532

(22) PCT Filed: Feb. 14, 2000

(86) PCT No.: PCT/JP00/00768

§ 371 (c)(1),
(2), (4) Date: Jan. 18, 2002

(87) PCT Pub. No.: WO01/60129

PCT Pub. Date: Aug. 16, 2001

(51) Int. Cl.[7] ............................ H05B 37/02; H02M 5/45
(52) U.S. Cl. ................... 315/224; 315/209 R; 315/246; 315/291; 315/307; 363/37; 363/40; 363/89; 363/132
(58) Field of Search ............................ 315/224, 209 R, 315/246, 291, 307, DIG. 7, 137, 148, 141, 194, 199, 200 R, 207, 208, 276; 363/37, 89, 40, 41, 36, 132, 131, 127, 85, 98

(56) References Cited

U.S. PATENT DOCUMENTS 4,042,856 A    8/1977   Steigerwald ................. 315/246
5,675,221 A  * 10/1997  Yoo et al. ..................... 315/291
5,712,540 A  *  1/1998  Toda et al. ..................... 318/46
6,304,465 B1 * 10/2001  Takita ........................... 363/37

FOREIGN PATENT DOCUMENTS

| JP | 52-54278  | 5/1977  |
| JP | 5-258879  | 10/1993 |
| JP | 7-220887  | 8/1995  |

* cited by examiner

Primary Examiner—Don Wong
Assistant Examiner—Tuyet T. Vo
(74) Attorney, Agent, or Firm—Burns, Doane, Swecker & Mathis, LLP

(57) ABSTRACT

This invention provides a discharge lamp lighting device and illumination device which can be miniaturized with high power factor and also is inexpensive. In the discharge lamp lighting device, in response to the zero crossing detected signal of a commercial AC power source detected by a detecting section, a voltage boosting/dropping circuit boosts or drops the commercial AC power source full-wave rectified by a rectifying circuit so that the current flowing through the discharge lamp is larger in the vicinity of the phases of 90° and 270° of the commercial AC power source than in the vicinity of the phases of 0° and 180° thereof, and a polarity changing circuit changes the polarity of the boosted or dropped current to be supplied to the discharge lamp. An illumination device is provided with such a discharge lamp lighting device.

20 Claims, 8 Drawing Sheets

DISCHARGE LAMP LIGHTING DEVICE AND ILLUMINATION DEVICE

TECHNICAL FIELD

This invention relates to a discharge lamp lighting device with a power source of an commercial AC and an illumination device equipped with the discharge lamp lighting device, and more particularly to those capable of lighting the discharge lamp with high power factor.

BACKGROUND OF THE INVENTION

Referring to FIG. 9, an explanation will be given of a conventional discharge lamp device. FIG. 9 is a circuit diagram of a conventional discharge lamp device which is disclosed in e.g. JP-A-9-45490.

In FIG. 9, reference numeral 101 denotes a commercial power source; 102 a rectifying circuit; 103 a voltage boosting inverter; 104 a voltage dropping inverter; 105 a square wave circuit; 106 a starting circuit; 107 a discharge lamp; 108 a voltage-boosting inverter control circuit; 109 a voltage-dropping inverter control circuit; 110 a square wave control circuit; and 111 a control power source circuit.

Referring to the drawing, an explanation will be given of the operation of the conventional discharge lamp device. When electric power is supplied from a commercial A.C. power source 101, the control power source circuit 111 creates control power which is fed to the voltage-boosting inverter circuit 108, voltage dropping circuit 109 and square-wave control circuit 110. As a result, these circuits start to operate.

First, the AC power from the commercial AC power source 101 is rectified by the rectifying circuit 102, and the rectified power is applied to the voltage boosting inverter 103. The voltage-boosting inverter 103 converts the applied DC voltage into a DC voltage of 400 V. Then, the voltage boosting inverter control circuit 108 corrects wave distortion of an input current supplied to the voltage-boosting inverter 103 to control the voltage-boosting inverter 103 so that the input power factor is approximately 100%.

Next, the voltage-dropping inverter 104 inverts the DC voltage supplied from the voltage-boosting inverter 103 into a DC voltage corresponding to a load change in the discharge lamp 107. Then, the voltage-dropping-inverter control circuit 109 controls the output voltage from the voltage dropping inverter 104 so that the current flowing through the discharge lamp 107 is a prescribed current, e.g. a constant current of 2 A.

The square wave circuit 105 converts the DC voltage applied from the voltage dropping inverter 104 into an AC square wave. Then, the square wave control circuit 110 controls the square wave circuit 105 so that the current flowing through the discharge lamp 107 is an AC square wave at a prescribed frequency of e.g. 100 Hz.

The starting circuit 106 generates a high voltage pulse by the AC square wave from the square wave circuit 105 to start the lighting of the discharge lamp 107.

The discharge lamp device which has a low power factor exerts anadverse effect on a commercial AC power system facility so that the discharge lamp device with a high power factor has been demanded. In order to give the high power factor to the device, as in the conventional discharge lamp device, using the voltage boosting inverter 103, the AC voltage must be converted into a DC voltage.

However, where the discharge lamp device is equipped with the voltage-boosting inverter 103, since the voltage-boosting inverter 103 itself is bulky, heavy and expensive, the discharge lamp device also becomes bulky, heavy and expensive.

This invention has been accomplished in order to solve the problem described above, and intends to provide a discharge lamp lighting device and illumination device which can be miniaturized with a high power factor and also is inexpensive.

DISCLOSURE OF THE INVENTION

The discharge lamp lighting device according to this invention is characterized by comprising:

a rectifying circuit for full-wave rectifying a commercial AC power source;

a voltage boosting/dropping circuit for boosting or dropping a voltage from the rectifying circuit;

a control section for controlling the boosted/dropped voltage from the voltage boosting/dropping circuit;

a polarity changing circuit for changing the polarity of the current boosted or dropped by the voltage boosting/dropping circuit;

a discharge lamp through which the current from the polarity changing circuit is passed; and a detecting section for detecting the zero crossing of the commercial AC power source, and in that in response to a zero-crossing detected signal detected by the detecting section, the control section controls the voltage boosting/dropping circuit so that the current flowing through the discharge lamp is larger in the vicinity of the phases of 90° and 270° of the commercial AC power source than in the vicinity of the phases of 0° and 180° thereof.

The discharge lamp lighting device according to this invention is also characterized in that when the polarity of the current passed through the discharge lamp by the polarity changing circuit is changed at a frequency equal to or higher than that of the commercial AC power source, it is changed at least in the vicinity of the phases of 0° and 180° thereof.

The discharge lamp lighting device according to this invention is also characterized in that when the polarity of the current passed through the discharge lamp by the polarity changing circuit is changed at a frequency equal to or higher than that of the commercial AC power source, it is changed at least in the vicinity of the phases of 90° and 270° thereof.

The discharge lamp lighting device according to this invention is also characterized in that the detecting section has a function of detecting the phase of the commercial AC power source, and the control section controls the voltage boosting/dropping circuit and the polarity changing circuit changes the polarity of the flowing current so that the current flowing through the discharge lamp is substantially in phase with that of the commercial AC power source voltage and has a substantially sine waveform.

The discharge lamp lighting device according to this invention is also characterized in that the current flowing through the discharge lamp is constant in the vicinity of the phases of 90° and 270°.

The discharge lamp lighting device according to this invention is also characterized in that the current flowing through the discharge lamp is the square of the sine wave in synchronism with the commercial AC power source voltage.

The discharge lamp lighting device according to this invention is also characterized by further comprising a voltage detecting section for detecting the voltage across the discharge lamp, and in that in response to the detected value from the voltage detecting section, the control section controls the voltage boosting/dropping circuit so that electric power supplied to the discharge lamp is constant.

The illumination device according to this invention is characterized by having a discharge lamp lighting device defined in any one of the discharge lamp lighting device described above.

BEST MODE OF CARRYING OUT THE INVENTION

Figure 1:
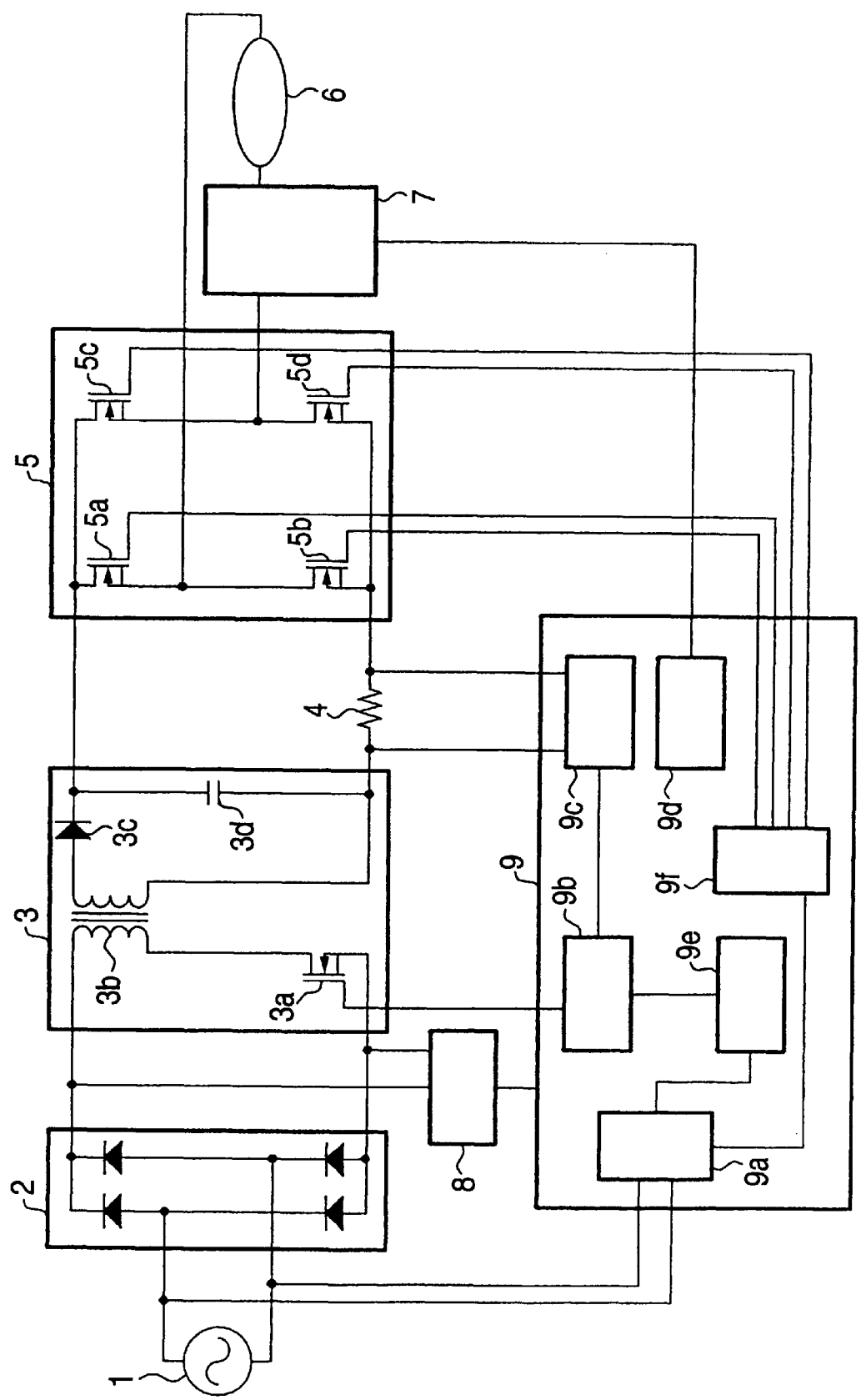
FIG. 1 is a block diagram showing an arrangement of a discharge lamp lighting device according to the first and second embodiments of this invention.

Now referring to the drawings, an explanation will be given of respective embodiments of this invention.

FIRST EMBODIMENT

Now referring to FIGS. 1 and 2, an explanation will be given of a discharge lamp lighting device according to the first embodiment of this invention. FIG. 1 is a block diagram showing an arrangement of a discharge lamp lighting device according to the first embodiment of this invention, and FIG. 2 is a waveform chart showing the operation of the discharge lamp lighting device according to the first embodiment of this invention.

In FIG. 1, reference numeral 1 denotes a commercial AC power source; 2 a rectifying circuit of a diode bridge which serves to full-wave rectify a commercial AC voltage; and 3 a voltage boosting/dropping converter for boosting or dropping the full-wave rectified voltage. The voltage boosting/dropping converter 3 includes a switching element 3a, a transformer 3b, a diode 3c and a capacitor 3d.

Reference numeral 4 denotes a current detecting resistor for detecting a current flowing through a discharge lamp 6, and reference numeral 5 denotes a polarity-changing circuit for changing the polarity of the current flowing through a discharge lamp 6. The polarity-changing circuit 5 includes a switching element 5a, a switching element 5b, a switching element 5c and a switching element 5d. Reference numeral 6 denotes a discharge lamp; 7 a starting pulse generating circuit for generating a high voltage pulse to start the discharge lamp; and 8 a control power source creating circuit for creating a control power source.

Reference numeral 9 denotes a control circuit which includes a detecting unit 9a for detecting a zero-crossing of a commercial AC, a control unit 9b for controlling the voltage boosting/dropping converter 3, a current detecting unit 9c for detecting the current flowing through the discharge lamp 6 based on the current detecting resistor 4, a starting pulse control unit 9d for controlling the starting pulse generating circuit 7, a target current computing unit 9e and a control unit 9f for controlling the polarity changing circuit 5.

In FIG. 2, (a) shows a current/voltage waveform of the commercial AC power source 1; (b) shows an ON/OFF state of the switching element 5a and a switching element 5d of the polarity changing circuit 5; (c) shows an ON/OFF state of the switching element 5b and a switching element 5c of the polarity changing circuit 5; (d) shows a target current computed by the target current computing unit 9e; and (e) shows a current flowing through the discharge lamp 6.

Now referring to the drawings, an explanation will be given of the operation of the discharge lamp lighting device according to the first embodiment of this invention.

When electric power is supplied from the commercial AC power source 1, the control power source creating circuit 8 creates the control power source to be supplied to the control circuit 9. Then, the control circuit 9 starts to operate. In the control circuit 9, the starting pulse control unit 9d controls the starting pulse generating circuit 7, which in turn supplies a high voltage pulse to the discharge lamp 6. Then, the discharge lamp is lit.

When the discharge lamp is lit, a current starts to flow to the current detecting resistor 4. This current is detected by the current detecting unit 9c. On the other hand, the target current computing unit 9e computes the target current. The control unit 9b compares the current detected by the current detecting unit 9c and the target current computed by the target current computing unit 9e and controls the voltage boosting/dropping converter 3 so that the detected current and the target current become equal to each other, thereby making feedback control.

In the voltage boosting/dropping conveter 3, the switching element 3a repeats ON/OFF at a high frequency of several tens of kHz. When the switching element 3a is "ON", a current flows to the primary side of the transformer 3b where energy is stored. On the other hand, when the switching element 3a is "OFF", the stored energy is discharged to the secondary side of the transformer 3b as electric power. Since the discharged electric power is at a high frequency of several tens kHz, the high frequency component is removed by the diode 3c and the capacitor 3d, and the resultant power is supplied to the discharge lamp 6.

Therefore, where the target current from the target current computing unit 9e is smaller than the detected current from the current detecting unit 9c, the control unit 9b increases the time of "ON" of the switching element 3a thereby to increase the electric power to be discharged to the secondary side, thereby increasing the current flowing through the discharge lamp 6. Where the detected current is larger than the target current, the control unit 9b decreases the time of "ON" of the switching element 3a to decrease the electric power to be discharged to the secondary side, thereby decreasing the current flowing through the discharge lamp 6. These operations are performed at a high speed so that the current flowing through the discharge lamp is equal to the target current.

The control unit 9f controls the polarity changing circuit 5 so that a set of the switching elements 5a and 5d and another set of the switching elements 5c and 5b are alternately turned ON. Thus, the DC current from the voltage boosting/dropping converter 3 is converted into an AC current, which flows through the discharge lamp 6.

Then, the detecting unit 9a produces a zero-crossing detected signal when the voltage in the commercial AC becomes zero volt in its periodic change.

Figures 2A, 2B, 2C, 2D, 2E:
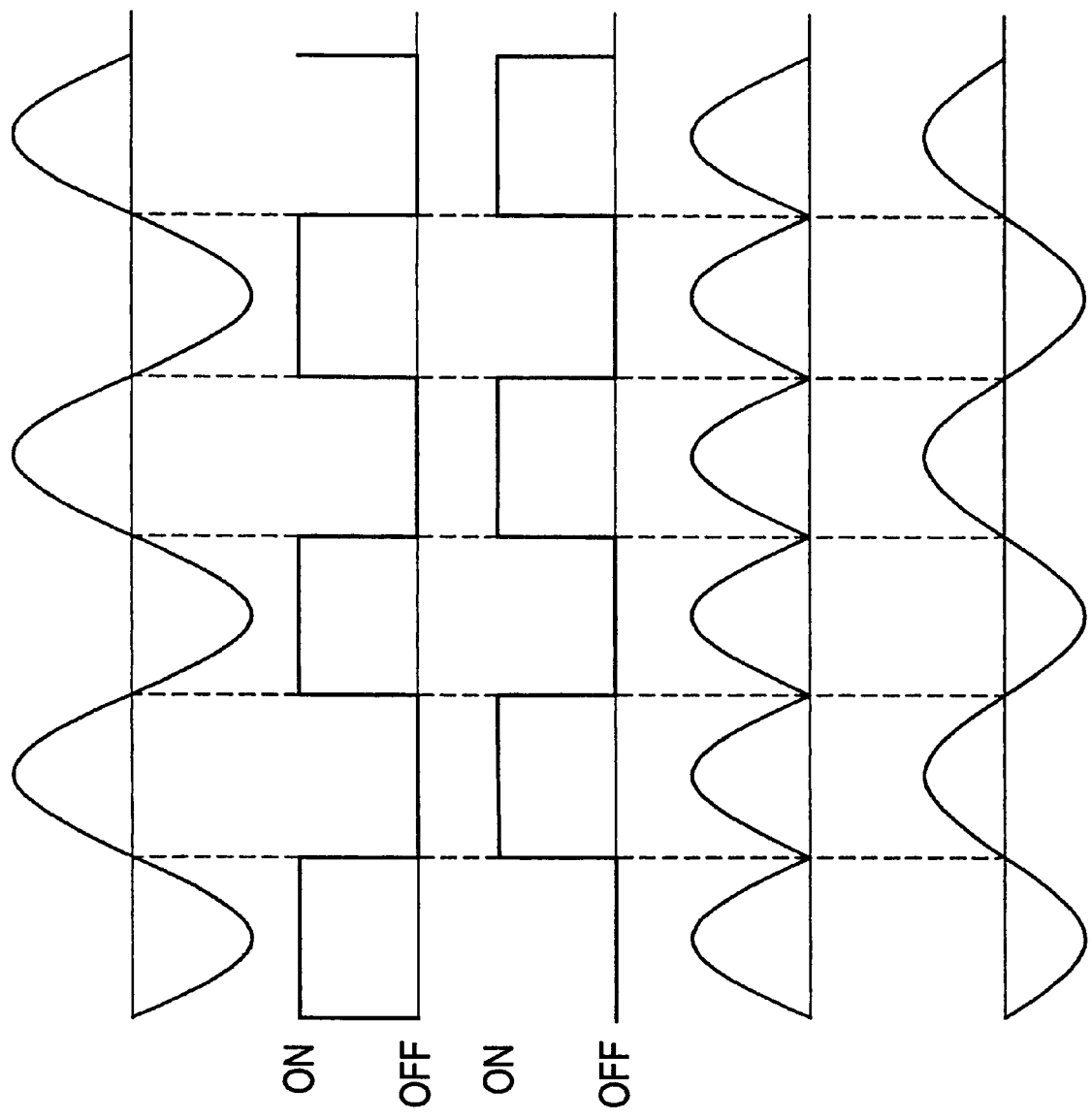
FIG. 2 is a waveform chart showing the operation of the discharge lamp lighting device according to the first embodiment of this invention.

In response to the zero-crossing detected signal from the detecting unit 9a, the target current computing unit 9e computes the target current on the basis of the commercial AC voltage waveform as shown in FIG. 2(a) so that it is small in the vicinity of 0° and 180° and large in the vicinity of 90° and 270° as shown in FIG. 2(d).

In response to the zero-crossing detected signal from the detecting unit 9a, the control unit 9f changes the set of the switching elements 5a and 5d between their "ON" and "OFF" as shown in FIG. 2(b) and changes the switching elements 5c and 5b between their "ON" and "OFF" as shown in FIG. 2(c).

Thus, as shown in FIG. 2(e), the current flowing through the discharge lamp 6 becomes a sinusoidal wave current whose polarity is changed at 0° and 180° and synchronous with the commercial AC power source 1 shown in FIG. 2(a). The current flowing into the discharge lamp lighting device from the commercial AC power source 1 is proportional to the current flowing through the discharge lamp 6. Therefore, the input current for the discharge lamp lighting device is also the sinusoidal wave current synchronous with the commercial AC power source 1, thereby increasing the input power factor. Further, unneccessity of a power factor improving circuit such as a voltage boosting inverter can provides a compact and inexpensive discharge lamp lighting device.

SECOND EMBODIMENT

Figure 3:
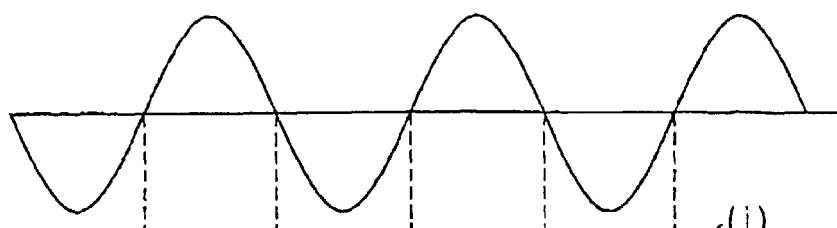
FIG. 3 is a waveform chart showing the operation of the discharge lamp lighting device according to the second embodiment of this invention.
Figure 3:
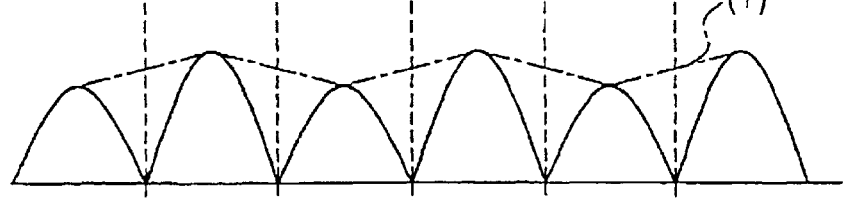
Figure 3:
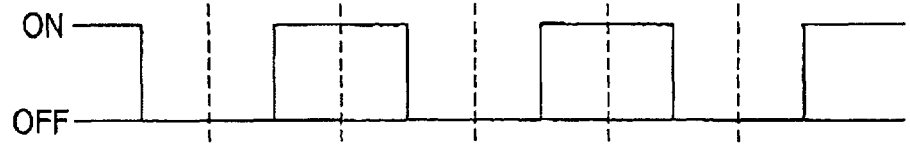
Figure 3:
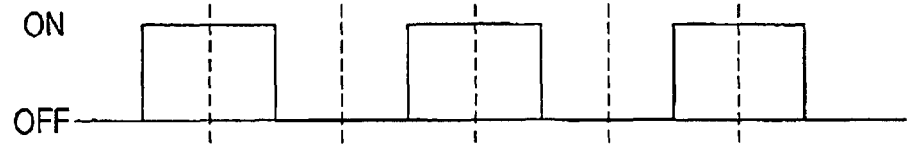
Figure 3:
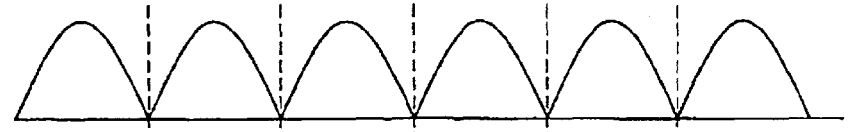
Figure 3:
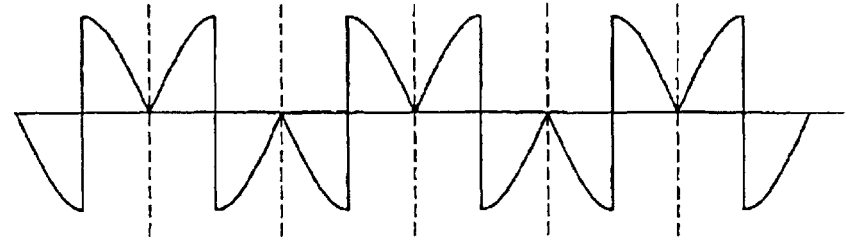
Figure 3:
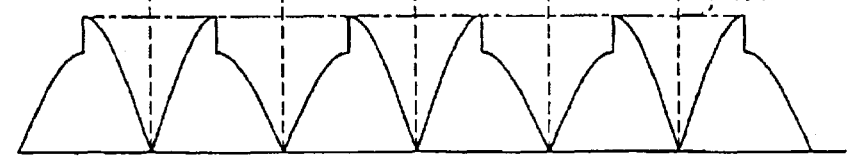

Referring to FIGS. 1 and 3, an explanation will be given of the discharge lamp lighting device according to the second embodiment of this invention. FIG. 1 is a block diagram showing an arrangement of a discharge lamp lighting device according to the second embodiment of this invention, which is the same as that of the first embodiment. FIG. 3 is a waveform chart showing the operation of the discharge lamp lighting device according to the second embodiment of this invention.

In FIG. 3, (a) shows a current/voltage waveform of the commercial AC power source 1; (b) shows a light flux discharged from the discharge lamp 6 before improvement; (c) shows an ON/OFF state of the switching element 5a and a switching element 5d of the polarity changing circuit 5; (d) shows an ON/OFF state of the switching element 5b and a switching element 5c of the polarity changing circuit 5; (e) shows a target current computed by the target current computing unit 9e; (f) shows a current flowing through the discharge lamp 6; and (g) shows a light flux discharged from the discharge lamp 6 after improvement.

In the first embodiment, the polarity of the current which is to be passed through the discharge lamp 6 is changed at 0° and 180° of the commercial AC power source as shown in FIG. 2(e). In this case, the size of the light flux discharged from the discharge lamp 6 provides a level difference between the polarities as shown in FIG. 3(b). Such a phenomenon is attributable to the fact that there is a difference in the light emission efficiency between the polarities even when the current with the same value between the positive and negative polarities is passed through the discharge lamp. Connecting the peak of the light fluxes in FIG. 3(b) gives a pulsating wave a shown by the line (i). Human's eyes are susceptible to such a pulsating wave at a low frequency as flicker.

Therefore, in accordance with the second embodiment, the control unit 9f controls the polarity changing circuit 5 so that for the commercial AC voltage waveform of FIG. 3(a), the ON/OFF states of a set of the switching elements 5a and 5b and of another set of the switching elements 5b and 5c are changed at 90° and 270° as shown in FIG. 3(c) and FIG. 3(d), respectively. Thus, the polarity of the target current shown in FIG. 3(e) computed by the target current computing unit 9e and produced from the voltage boosting/dropping converter 3 is changed by the polarity changing circuit 5 as shown in FIG. 3(f). Thus, the current which is small in the vicinity of 0° and 180° and large in the vicinity of 90° and 270° flows through the discharge lamp 6.

As a result, the current flowing through the discharge lamp 6 is substantially in phase with the commercial AC power source voltage and its absolute value is controlled by the sinusoidal wave current. Thus, the size of the light flux discharged from the discharged lamp 6 is such as shown in FIG. 3(g) and provides a uniform peak value. The human's eyes are difficult to susceptible to such a light flux as flicker as compared with the first embodiment.

THIRD EMBODIMENT

Figure 4:
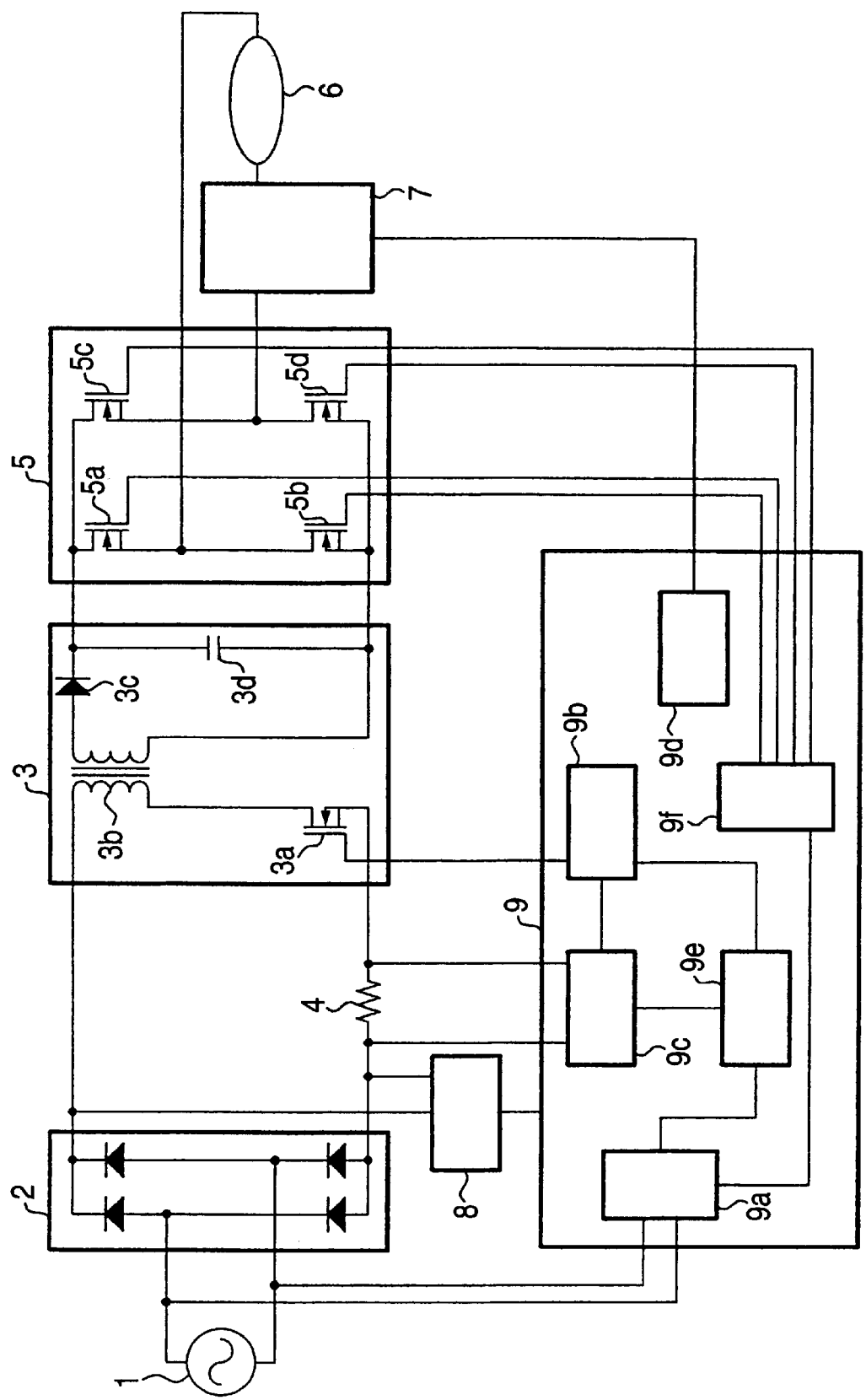
FIG. 4 is a block diagram showing an arrangement of a discharge lamp lighting device according to the third embodiment of this invention.

Referring to FIG. 4, an explanation will be given of the discharge lamp lighting device according to the third embodiment of this invention. FIG. 4 is a block diagram showing an arrangement of a discharge lamp lighting device according to the third embodiment of this invention.

In FIG. 4, the current detecting resistor 4 is located between the rectifying circuit 2 and the voltage boosting/dropping converter 3. The remaining structure is the same as that of the discharge lamp lighting device according to the first embodiment or the second embodiment.

Referring to the drawings, an explanation will be given of the operation of the discharge lamp lighting device according to the third embodiment of this invention. The operation of the other arrangement than the current detecting resistor 4 is the same as that in the discharge lamp lighting device according to the first embodiment or second embodiment.

As regards the operation of the current detecting resistor 4, the resistor 4 was used to detect the discharge lamp current in the discharge lamp lighting device according to the first embodiment or the second embodiment. On the other hand, in the third embodiment, the resistor 4 is used to detect the input current to the discharge lamp lighting device. The target current is computed so that the detected input current is small in the vicinity of 0° and 180°, and large in the vicinity of 90° and 270°. The control unit 9b controls the voltage boosting/dropping converter 3 so that the target current is equal to the detected current from the current detecting unit 9c, thereby making feedback control.

As a result, the input current for the discharge lamp lighting device is also the sinusoidal wave current synchronous with the commercial AC power source 1, thereby increasing the input power factor. Further, unneccessity of a power factor improving circuit such as a voltage boosting inverter can provides a compact and inexpensive discharge lamp lighting device.

FOURTH EMBODIMENT

Figure 5:
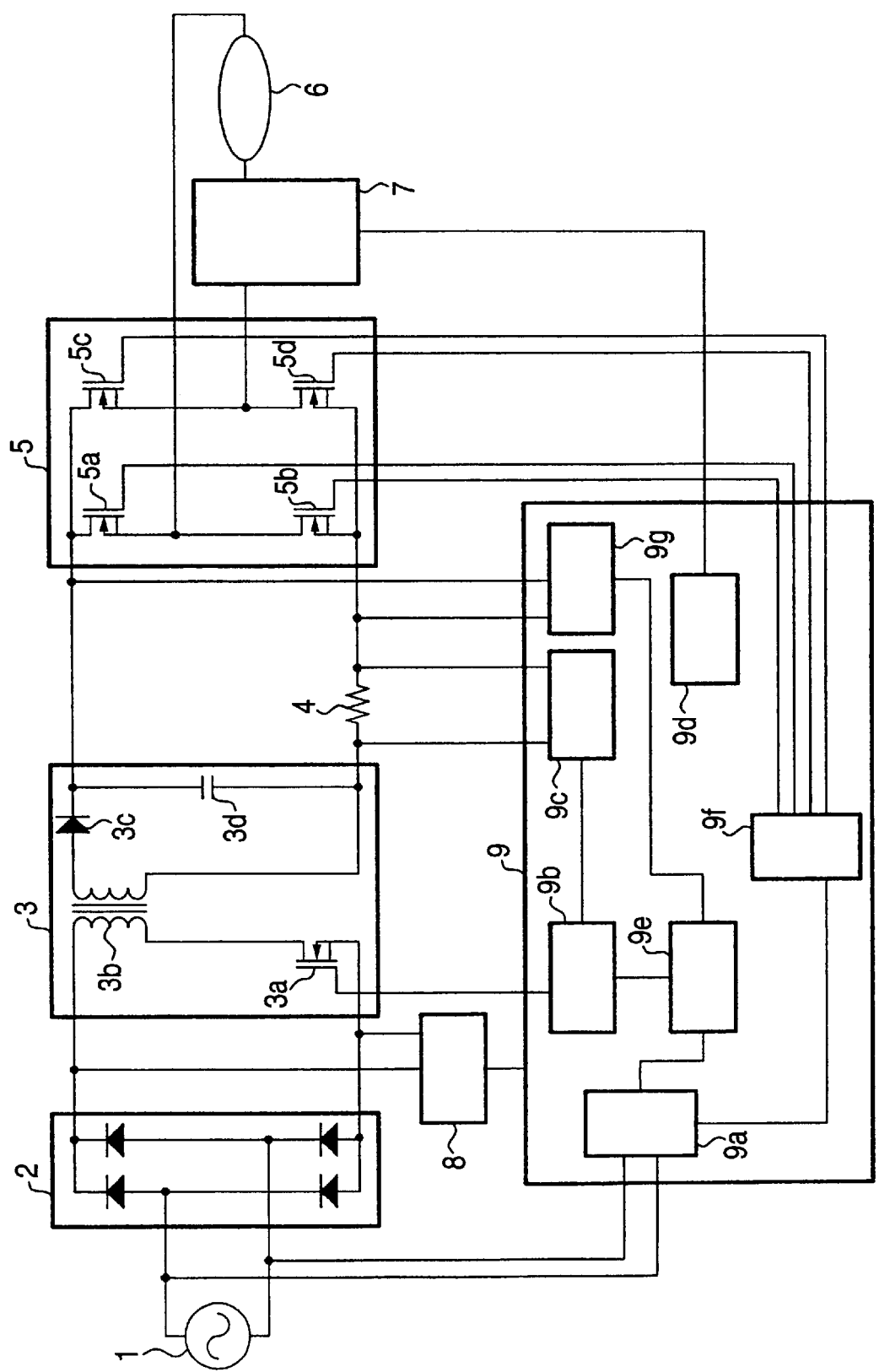
FIG. 5 is a block diagram showing an arrangement of a discharge lamp lighting device according to the fourth embodiment of this invention.

Referring to FIG. 5, an explanation will be given of the discharge lamp lighting device according to the fourth embodiment of this invention. FIG. 5 is a block diagram showing an arrangement of a discharge lamp lighting device according to the fourth embodiment of this invention.

In FIG. 5, reference numeral 9g denotes a discharge lamp voltage detecting unit provided in the control circuit 9. The remaining structure is the same as that of the discharge lamp lighting device according to the first embodiment or the second embodiment.

Referring to FIG. 5, an explanation will be given of the operation of the discharge lamp lighting device according to the fourth embodiment of this invention. The operation of the other arrangement than the discharge lamp voltage detecting unit 9g is the same as that in the discharge lamp lighting device according to the first embodiment or second embodiment.

As regards the operation of the control circuit 9, in response to the voltage information of the discharge lamp 6 supplied from the discharge lamp voltage detecting unit 9g, when the voltage of the discharge lamp 6 is high, the target current computing unit 9e decreases the amplitude of the target current, for example, when the discharge lamp voltage is 100 V, the amplitude of the target current is reduced to 1.5 A. When the voltage of the discharge lamp 6 is low, the amplitude of the target current is increased, for example, when the discharge lamp voltage is 75 V, the amplitude of the target current is increased to 2.0 A. The control unit 9b controls the voltage boosting/dropping converter 3 so that the target current is equal to the detected current from the current detecting unit 9c, thereby making feedback control.

As a result, the power supplied to the discharge lamp remains constant regardless with a difference in the discharge lamp voltage due to the secular change of the discharge lamp and difference in bodies, and hence the discharge lamp provide constant brightness.

FIFTH EMBODIMENT

Figure 6:
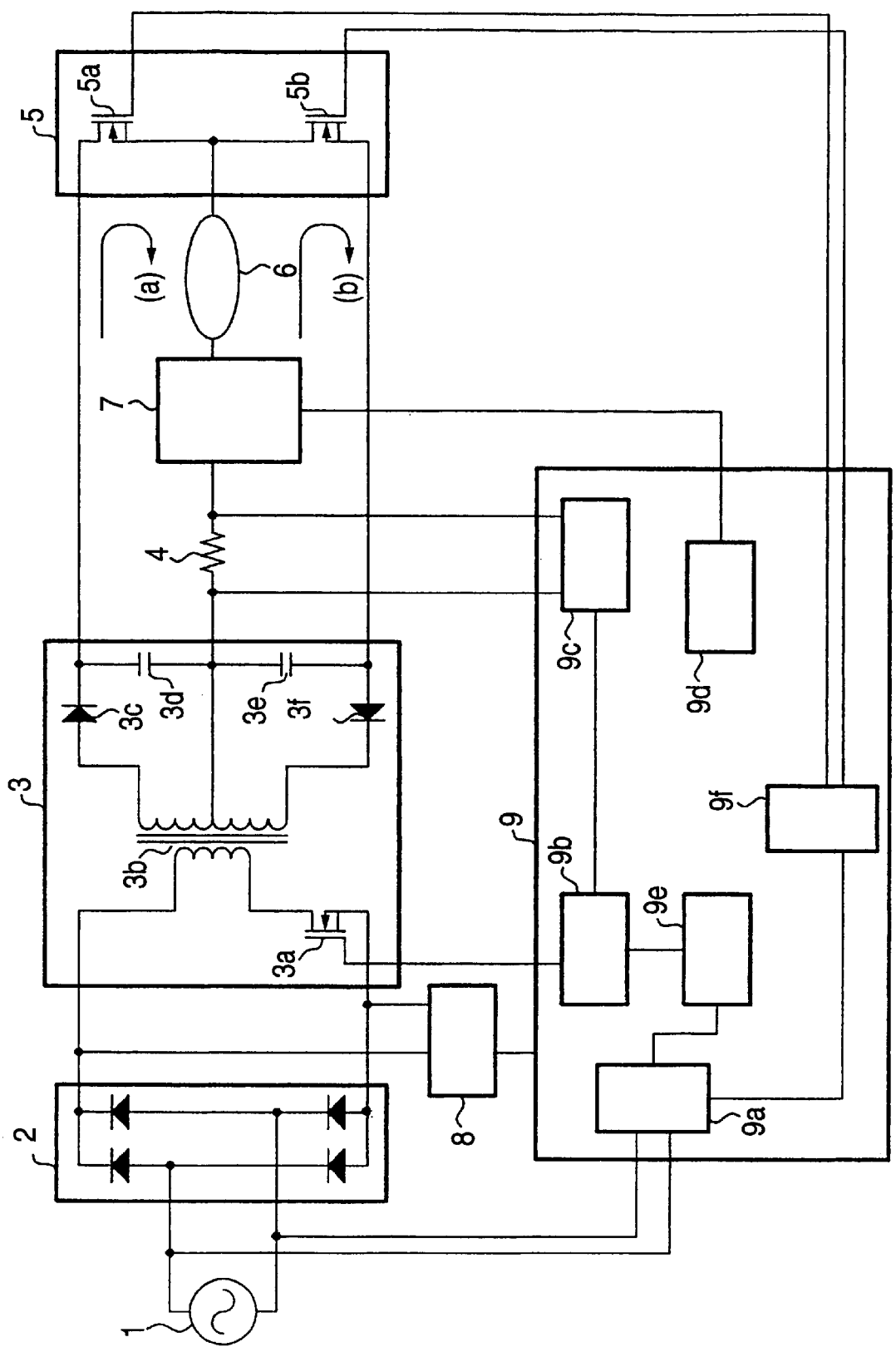
FIG. 6 is a block diagram showing an arrangement of a discharge lamp lighting device according to the fifth embodiment of this invention.

Now referring to FIG. 6, an explanation will be given of a discharge lamp lighting device according to the fifth embodiment of this invention. FIG. 6 is a block diagram showing an arrangement of a discharge lamp lighting device according to the fifth embodiment of this invention.

In FIG. 6, reference numeral 1 denotes a commercial AC power source; 2 a rectifying circuit of a diode bridge which serves to full-wave rectify a commercial AC voltage; and 3 a voltage boosting/dropping converter for boosting or dropping the full-wave rectified voltage. The voltage boosting/dropping converter 3 includes a switching element 3a, a transformer 3b, a diode 3c, a diode 3f, a capacitor 3d and a capacitor 3e.

Reference numeral 4 denotes a current detecting resistor for detecting a current flowing through a discharge lamp 6, and reference numeral 5 denotes a polarity-changing circuit for changing the polarity of the current flowing through a discharge lamp 6. The polarity-changing circuit 5 includes a switching element 5a and a switching element 5b. Reference numeral 6 denotes a discharge lamp; 7 a starting pulse generating circuit for generating a high voltage pulse to start the discharge lamp 6; and 8 a control power source creating circuit for creating a control power source.

Reference numeral 9 denotes a control circuit which includes a detecting unit 9a for detecting a zero-crossing of a commercial AC, a control unit 9b for controlling the voltage boosting/dropping converter 3, a current detecting unit 9c for detecting the current flowing through the discharge lamp 6 based on the current detecting resistor 4, a starting pulse control unit 9d for controlling the starting pulse generating circuit 7, a target current computing unit 9e and a control unit 9f for controlling the polarity changing circuit 5.

Referring to the drawings, an explanation will be given of the operation of the discharge lamp lighting device according to the fifth embodiment of this invention.

First, when electric power is supplied from the commercial AC power source 1, the control power source creating circuit 8 creates the control power source to be supplied to the control circuit 9. Then, the control circuit 9 starts to operate. In the control circuit 9, the starting pulse control unit 9d controls the starting pulse generating circuit 7, which in turn applies a high voltage pulse to the discharge lamp 6. Then, the discharge lamp 6 is lit.

When the discharge lamp 6 is lit, a current starts to flow through the current detecting resistor 4. This current is detected by the current detecting unit 9c. On the other hand, the target current computing unit 9e computes the target current. The control unit 9b compares the current detected by the current detecting unit 9c and the target current computed by the target current computing unit 9e and controls the voltage boosting/dropping converter 3 so that the detected current and the target current become equal to each other, thereby making feedback control.

In the voltage boosting/dropping converter 3, the switching element 3a repeats ON/OFF at a high frequency of several tens of kHz. When the switching element 3a is "ON", a current flows to the primary side of the transformer 3b where energy is stored. On the other hand, when the switching element 3a is "OFF", the stored energy is discharged to the secondary side of the transformer 3b as electric power.

In this case, if the high frequency component of the switching element 5a of the polarity changing circuit 5 is "ON", the discharged electric power at a high frequency of several tens kHz is removed by the diode 3c, and the capacitor 3d and the current flows in a direction of arrow (a) in FIG. 6. On the other hand, if the switching element 5b of the polarity changing circuit 5 is "ON", the high frequency component of the discharged electric power at a high frequency of several tens kHz is removed by the diode 3f and the capacitor 3e, and the current flows in a direction of arrow (b) in FIG. 6.

Thus, where the target current from the target current computing unit 9e is smaller than the detected current from the current detecting unit 9c, the control unit 9b increases the time of "ON" of the switching element 3a thereby to increase the electric power to be discharged to the secondary side, thereby increasing the current flowing through the discharge lamp 6. Where the detected current is larger than the target current, the control unit 9b decreases the time of "ON" of the switching element 3a to decrease the electric power to be discharged to the secondary side, thereby decreasing the current flowing through the discharge lamp 6. These operations are performed at a high speed so that the current flowing through the discharge lamp is equal to the target current.

The control unit 9f controls the polarity changing circuit 5 so that the switching elements 5a and 5b are alternately turned ON. Thus, an AC current flows through the discharge lamp 6. The detecting unit 9a detects zero-crossings and the period between the zero-crossings of the commercial AC power source 1. In response to the zero-crossing detected signal produced from the detecting unit 9a, the target current computing unit 9e computes the target current on the basis of the commercial AC voltage waveform as shown in FIG.

2(a) so that it is small in the vicinity of 0° and 180° and large in the vicinity of 90° and 270° as shown in FIG. 2(d).

In response to the zero-crossing detected signal from the detecting unit 9a, as in the first embodiment, the control unit 9f changes the switching element between the switching elements 5a and 5b at 0° and 180° of the commercial AC power source so that the current flowing through the discharge lamp 6 is inverted at 0° and 180°.

Thus, the current flowing through the discharge lamp 6 becomes a sinusoidal wave current which is synchronous with the commercial AC power source 1. In addition, the current flowing into the discharge lamp lighting device from the commercial AC power source 1 is proportional to the current flowing through the discharge lamp 6. Therefore, the input current for the discharge lamp lighting device is also the sinusoidal wave current synchronous with the commercial AC power source 1, thereby increasing the input power factor. Further, unneccessity of a power factor improving circuit such as a voltage boosting inverter can provides a compact and inexpensive discharge lamp lighting device.

Otherwise, in response to the zero crossing detected signal, as in the second embodiment, the control unit 9f changes the switching element between the switching elements 5a and 5b at 90° and 270° of the commercial AC power source power source so that the current flowing through the discharge lamp 6 is inverted at 90° and 270°.

Thus, the size of the light flux discharged from the discharged lamp 6 provides a uniform peak value. The human's eyes are difficult to susceptible to such a light flux as flicker.

EMBODIMENT 6

Figure 7:
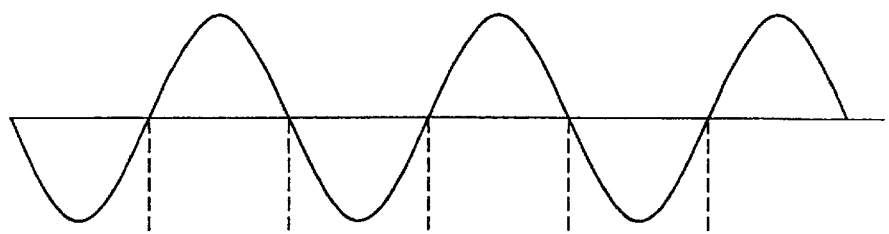
FIG. 7 is a waveform chart showing the operation of the discharge lamp lighting device according to the sixth embodiment of this invention.
Figure 7:
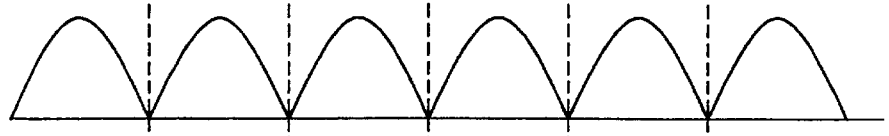
Figure 7:
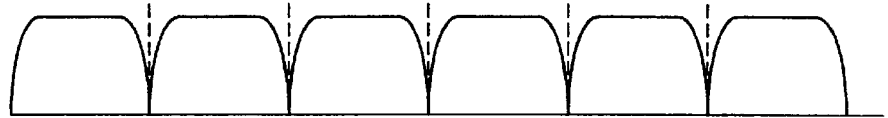

Referring to FIG. 7, an explanation will be given of the discharge lamp lighting device according to the sixth embodiment of this invention. FIG. 7 is a waveform chart showing the operation of the discharge lamp lighting device according to the sixth embodiment of this invention.

In FIG. 7, (a) shows a current/voltage of the commercial AC voltage of the commercial AC power source 1; (b) shows a target current computed by the target current computing unit 9e according to the first to fifth embodiments; and (c) shows the target current computed by the target computing unit 9e according to this embodiment, which is flat in the vicinity of 90° and 270°.

In this embodiment, the other operation than that as illustrated in FIG. 7(c) is the same as that in the first to fifth embodiments.

In this embodiment, the target current computing unit 9e computes the target current shown in FIG. 7(c). The control unit 9b compares the current detected by the current detecting unit 9c and the target current computed by the target current computing unit 9e and controls the voltage boosting/dropping converter 3 so that the detected current and the target current become equal to each other, thereby making feedback control.

Thus, the peak the light flux becomes flat like the current waveform so that the human's eyes are further difficult to susceptible to such a light flux as flicker.

SEVENTH EMBODIMENT

Figure 8:
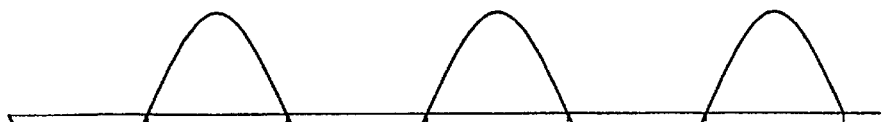
FIG. 8 is a waveform chart showing the operation of the discharge lamp lighting device according to the seventh embodiment of this invention.
Figure 8:
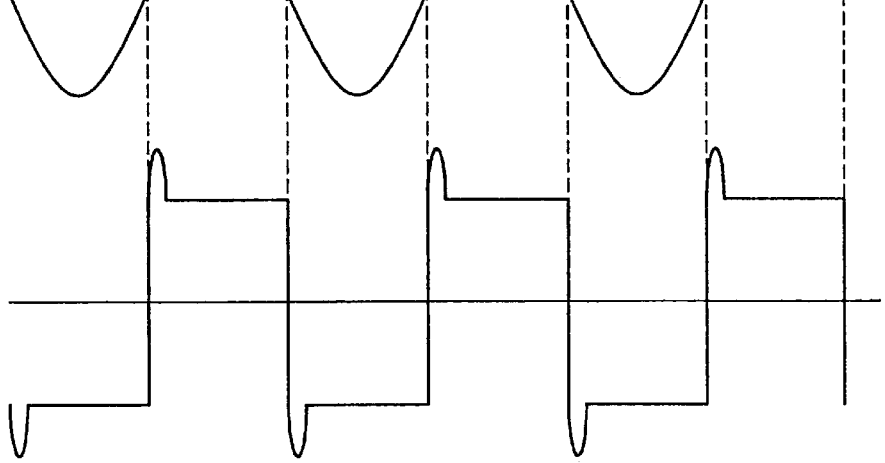
Figure 9:
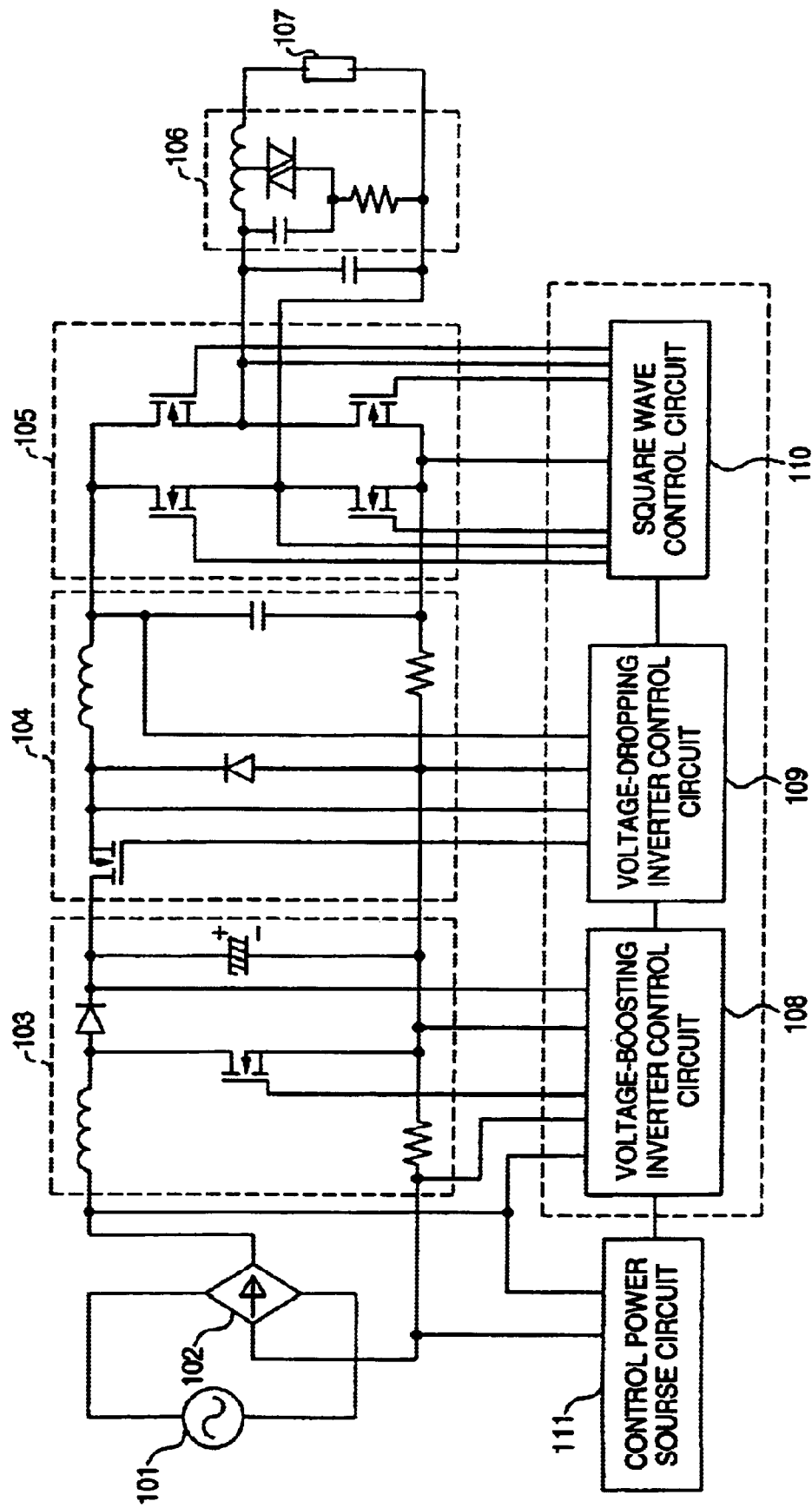
FIG. 9 is a circuit diagram showing a conventional discharge lamp lighting device.

Referring to FIG. 8, an explanation will be given of the discharge lamp lighting device according to the seventh embodiment of this invention. FIG. 8 is a waveform chart showing the operation of the discharge lamp lighting device according to the sixth embodiment of this invention.

In FIG. 8, (a) shows a discharge lamp current waveform; and (b) shows a discharge lamp voltage waveform. In this embodiment, the other operation than that illustrated in FIG. 8 is the same as that in the first to sixth embodiments.

As apparent from FIG. 8, the discharge lamp voltage provides jumps due to a reignition voltage at the points where the discharge lamp current is small. In the other region, the discharge lamp voltage exhibits a constant voltage characteristic.

Assuming that the discharge lamp voltage is a prescribed constant voltage A and the commercial AC voltage is represented by $V \cdot \sin \theta$, in order that the current flowing from the commercial AC power source into the discharge lamp lighting device has a waveform of $I \cdot \sin \theta$ which is synchronous with the commercial AC power source voltage, it is desirable that the discharge lamp current may have a waveform of square of $\sin \theta$ on the basis of an equation of $V \cdot \sin \theta \times I \cdot \sin \theta = A \times$ discharge lamp current. In this case, the input current provides a waveform of $\sin \theta$ synchronous with the commercial AC power source voltage so that it provides least distortion of the input current and improves the power factor.

The target current computing unit 9e computes the target current of the square of $\sin \theta$. The control unit 9b compares the current detected by the current detecting unit 9c and the target current computed by the target current computing unit 9e and controls the voltage boosting/dropping converter 3 so that the detected current and the target current become equal to each other, thereby making feedback control.

The first to seventh embodiments have been explained in connection with the discharge lamp lighting device. However, where these discharge lamp lighting device is attached to an illumination device, the illumination device which gives less flicker, is inexpensive and compact can be provided.

Industrial Applicability

As described above, the discharge lamp lighting device according to this invention is characterized by comprising:
  a rectifying circuit for full-wave rectifying a commercial AC power source;
  a voltage boosting/dropping circuit for boosting or dropping a voltage from the rectifying circuit;
  a control section for controlling the boosted/dropped voltage from the voltage boosting/dropping circuit;
  a polarity changing circuit for changing the polarity of the current boosted or dropped by the voltage boosting/dropping circuit;
  a discharge lamp through which the current from the polarity changing circuit is passed; and
  a detecting section for detecting the zero crossing of the commercial AC power source, and in that
  in response to the zero-crossing detected signal detected by the detecting section, the control section controls the voltage boosting/dropping circuit so that the current flowing through the discharge lamp is larger in the vicinity of the phases of 90° and 270° of the commercial AC power source than in the vicinity of the phases 0° and 180° thereof. In such a configuration, the input current for the discharge lamp lighting device is synchronous with the commercial AC voltage, thereby increasing the input power factor. Therefore, without using a power factor improving circuit such as a voltage boosting inverter, the discharge lamp lighting device can have an increased input power factor and can be made compact and inexpensive.

As described above, the discharge lamp lighting device according to this invention is also characterized in that when the polarity of the current passed through the discharge lamp by the polarity changing circuit is changed at a frequency equal to or higher than that of the commercial AC power source, it is changed at least in the vicinity of the phases of 0° and 180° thereof. In this configuration, since the current flowing through the discharge lamp when the polarity is changed is approximately zero, there is no loss of changing the polarity so that noise occurrence is also suppressed, thereby realizing the high efficiency of the lighting device.

Further, as described above, the discharge lamp lighting device according to this invention is also characterized in that when the polarity of the current passed through the discharge lamp by the polarity changing circuit is changed at a frequency equal to or higher than that of the commercial AC power source, it is changed at least in the vicinity of the phases of 90° and 270° thereof. In this configuration, a difference in the peaks of the fluxes which is attributable to the light emitting efficiency of the discharge lamp according to the polarity is removed, thereby reducing flicker.

The discharge lamp lighting device according to this invention is also characterized in that the detecting section has a function of detecting the phase of the commercial AC power source, and the control section controls the voltage boosting/dropping circuit and the polarity changing circuit changes the polarity of the flowing current so that the current flowing through the discharge lamp is substantially in phase with that of the commercial AC power source voltage and has a substantially sine waveform. In this configuration, the current flowing from the commercial AC power source into the discharge lamp lighting device has also sine waveform, thereby reducing the distortion thereof.

As described above, the discharge lamp lighting device according to this invention is also characterized in that the current flowing through the discharge lamp is constant in the vicinity of the phases of 90° and 270°. Therefore, the peak of the light flux becomes flat in an increased region, thereby reducing flicker.

As described above, the discharge lamp lighting device according to this invention is also characterized in that the current flowing through the discharge lamp is the square of the sine wave in synchronism with the commercial AC power source voltage. Therefore, the input current has a sine waveform in synchronism with the commercial AC power source voltage so that it provides least distortion and improves the power factor.

As described above, the discharge lamp lighting device according to this invention is also characterized by further comprising a voltage detecting section for detecting the voltage across the discharge lamp, and in that in response to the detected value of the voltage detected section, the control section controls the voltage boosting/dropping circuit so that electric power supplied to the discharge lamp is constant. In this configuration, the power supplied to the discharge lamp remains constant regardless with a difference in the discharge lamp voltage due to the secular change of the discharge lamp and difference in bodies, and hence the discharge lamp provides constant brightness.

As described above, the illumination device is characterized by having a discharge lamp lighting device defined in any one of the discharge lamp lighting device described above. Therefore, the illumination device which gives less flicker, is inexpensive and compact can be provided.

What is claimed is:

1. A discharge lamp lighting device comprising:
    a rectifying circuit for full-wave rectifying a commercial AC power source;
    a voltage boosting/dropping circuit for boosting or dropping a voltage from the rectifying circuit;
    a control section for controlling the boosted/dropped voltage from the voltage boosting/dropping circuit;
    a polarity changing circuit for changing polarity of a current boosted or dropped by the voltage boosting/dropping circuit;
    a discharge lamp through which the current from the polarity changing circuit is passed; and
    a detecting section for detecting a zero crossing of the commercial AC power source,
    wherein in response to the zero-crossing detected signal detected by the detecting section, the control section controls the voltage boosting/dropping circuit so that the current flowing through the discharge lamp is larger in the vicinity of the phases of 90° and 270° of the commercial AC power source than in the vicinity of the phases of 0° and 180° thereof.

2. The discharge lamp lighting device according to claim 1, further comprising a voltage detecting section for detecting the voltage across the discharge lamp, wherein in response to the detected value from the voltage detected section, the control section controls the voltage boosting/dropping circuit so that electric power supplied to the discharge lamp is constant.

3. An illumination device having a discharge lamp lighting device defined in claim 1.

4. The discharge lamp lighting device according to claim 1, wherein when the polarity of the current passed through the discharge lamp by the polarity changing circuit is changed at a frequency equal to or higher than that of the commercial AC power source, it is changed at least in the vicinity of the phases of 0° and 180° thereof.

5. The discharge lamp lighting device according to claim 4, wherein the detecting section has a function of detecting the phase of the commercial AC power source, and the control section controls the voltage boosting/dropping circuit and the polarity changing circuit changes the polarity of the flowing current so that the current flowing through the discharge lamp is substantially in phase with that of the commercial AC power source voltage and has a substantially sine waveform.

6. The discharge lamp lighting device according to claim 4, further comprising a voltage detecting section for detecting the voltage across the discharge lamp, wherein in response to the detected value from the voltage detected section, the control section controls the voltage boosting/dropping circuit so that electric power supplied to the discharge lamp is constant.

7. An illumination device having a discharge lamp lighting device defined in claim 4.

8. The discharge lamp lighting device according to claim 1, wherein when the polarity of the current passed through the discharge lamp by the polarity changing circuit is changed at a frequency equal to or higher than that of the commercial AC power source, it is changed at least in the vicinity of the phases of 90° and 270° thereof.

9. The discharge lamp lighting device according to claim 8, wherein the detecting section has a function of detecting the phase of the commercial AC power source, and the control section controls the voltage boosting/dropping circuit and the polarity changing circuit changes the polarity of the flowing current so that the current flowing through the discharge lamp is substantially in phase with that of the commercial AC power source voltage and has a substantially sine waveform.

10. The discharge lamp lighting device according to claim 8, further comprising a voltage detecting section for detecting the voltage across the discharge lamp, wherein in response to the detected value from the voltage detected section, the control section controls the voltage boosting/dropping circuit so that electric power supplied to the discharge lamp is constant.

11. An illumination device having a discharge lamp lighting device defined in claim 8.

12. The discharge lamp lighting device according to claim 1, wherein the detecting section has a function of detecting the phase of the commercial AC power source, and the control section controls the voltage boosting/dropping circuit and the polarity changing circuit changes the polarity of the flowing current so that the current flowing through the discharge lamp is substantially in phase with that of the commercial AC power source voltage and has a substantially sine waveform.

13. The discharge lamp lighting device according to claim 12, further comprising a voltage detecting section for detecting the voltage across the discharge lamp, wherein in response to the detected value from the voltage detected section, the control section controls the voltage boosting/dropping circuit so that electric power supplied to the discharge lamp is constant.

14. An illumination device having a discharge lamp lighting device defined in claim 12.

15. The discharge lamp lighting device according to claim 12, wherein the current flowing through the discharge lamp is constant in the vicinity of the phases of 90° and 270°.

16. The discharge lamp lighting device according to claim 15, further comprising a voltage detecting section for detecting the voltage across the discharge lamp, wherein in response to the detected value from the voltage detected section, the control section controls the voltage boosting/dropping circuit so that electric power supplied to the discharge lamp is constant.

17. An illumination device having a discharge lamp lighting device defined in claim 15.

18. The discharge lamp lighting device according to claim 12, wherein the current flowing through the discharge lamp is the square of the sine wave in synchronism with the commercial AC power source voltage.

19. The discharge lamp lighting device according to claim 18, further comprising a voltage detecting section for detecting the voltage across the discharge lamp, wherein in response to the detected value from the voltage detected section, the control section controls the voltage boosting/dropping circuit so that electric power supplied to the discharge lamp is constant.

20. An illumination device having a discharge lamp lighting device defined in claim 18.

* * * * *